July 31, 1951 G. J. HUEBNER, JR 2,562,357
SYNCHRONIZING CLUTCH
Original Filed April 4, 1942 2 Sheets-Sheet 1
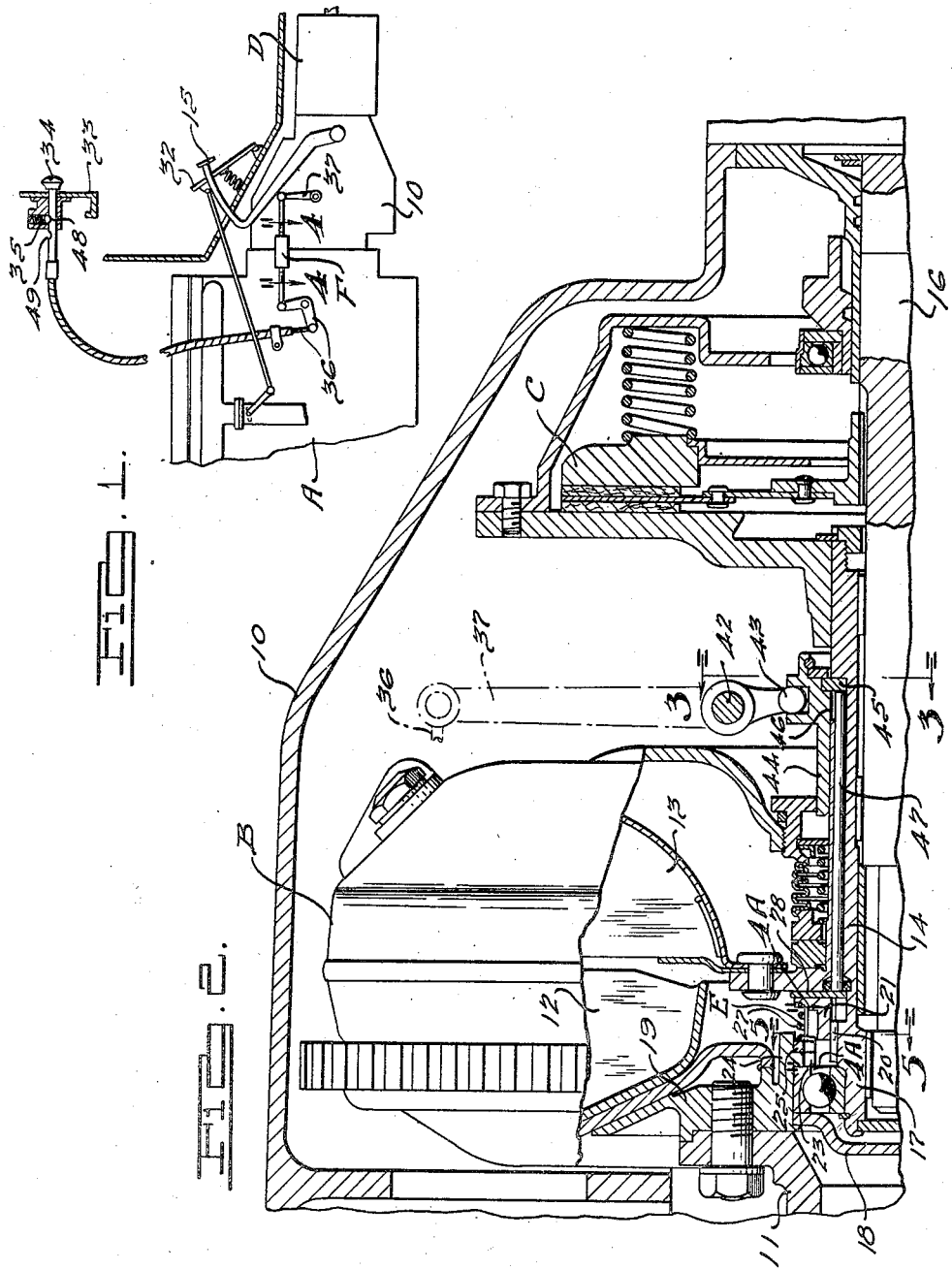
INVENTOR
George J. Huebner, Jr.
BY
Harness & Harris
ATTORNEYS.

July 31, 1951 G. J. HUEBNER, JR 2,562,357
SYNCHRONIZING CLUTCH
Original Filed April 4, 1942 2 Sheets-Sheet 2
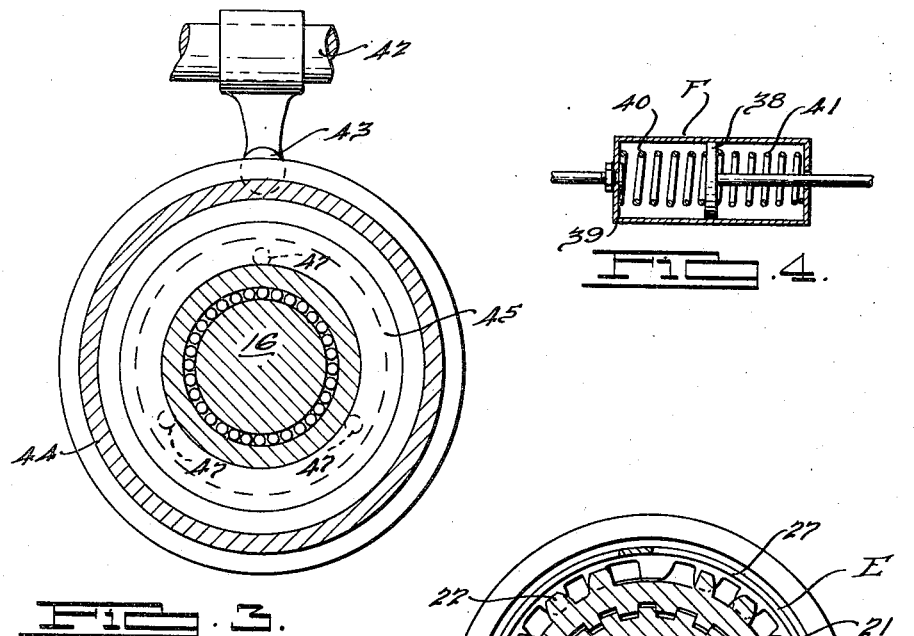
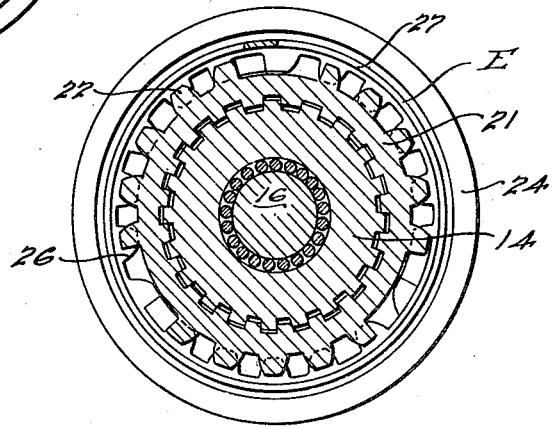
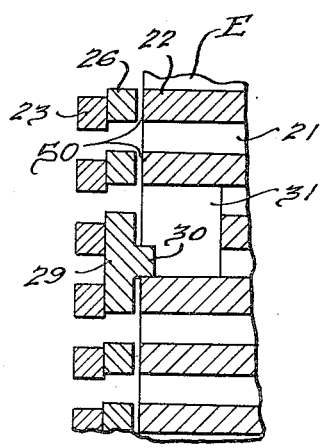
INVENTOR
George J. Huebner, Jr.
BY Harness & Harris
ATTORNEYS Patented July 31, 1951

2,562,357

UNITED STATES PATENT OFFICE 2,562,357

SYNCHRONIZING CLUTCH

George J. Huebner, Jr., Detroit, Mich., assignor to Chrysler Corporation, Highland Park, Mich., a corporation of Delaware Original application April 4, 1942, Serial No. 437,622. Divided and this application April 26, 1945, Serial No. 590,331

24 Claims. (Cl. 192—53)

This invention relates to drive control mechanism and in particular to jaw clutch mechanism having means for preventing engagement of the clutch while differential rotation exists between the members thereof. The instant application is a division of my copending application Serial No. 437,622, filed April 4, 1942, now Patent No. 2,418,838, granted April 15, 1947.

According to present practice it is customary to take the vehicle drive from the engine to the transmission through a fluid coupling or other slipping drive-transmitter in which oil is circulated in transmitting the drive. These driving systems are open to the objection that slipping is always present through the fluid coupling and while such slip is advantageously employed under a variety of well-known conditions it is a disadvantage under other conditions. For example, in parking the vehicle on an incline it is not possible to utilize the engine for braking purposes. Also, if, because of loss of the coupling oil or for any other reason, it is desired to drive the vehicle independently of the coupling oil, such conventional arrangements do not accommodate drive of this character.

It is an object of my invention to provide improved drive means whereby the fluid coupling may be readily locked out.

Another object is to provide a fluid coupling lock-out capable of providing selective drive either through the coupling or independently thereof, the mechanism being selectively operable while the vehicle is driving, coasting, or parked.

A further object is to provide a coupling lock-out for positive two-way drive by means insuring synchronous operation of the lock-out mechanism thereby avoiding damage to the mechanism and jolt to the vehicle passengers.

A specific object is to provide a novel jaw clutch structure including blocking mechanism for insuring engagement of the clutch members only during synchronous operation thereof.

A further object is to provide a preselectively operable control both for locking out the coupling and for restoring the same to normal operation.

Further objects and advantages of my invention will be more apparent as this specification progresses, reference being made to the accompanying drawings in which:

Fig. 1 is a side elevational view of a vehicle driving mechanism illustrating the driver controls for my coupling lock-out.

Fig. 2 is a longitudinal sectional elevational view through the upper half of a fluid coupling drive mechanism illustrating my invention applied thereto.

Fig. 3 is an enlarged sectional elevational view taken as indicated by line 3—3 of Fig. 2.

Fig. 4 is a detail sectional plan view along line 4—4 of Fig. 1.

Fig. 4A is a development illustrating the blocker clutching mechanism and taken generally as indicated by line 4A—4A of Fig. 2.

Fig. 5 is a sectional elevational view as indicated by line 5—5 of Fig. 2.

Referring to the drawings I have illustrated my invention in connection with a motor vehicle drive comprising the usual engine A which is adapted to transmit its drive through fluid coupling B and clutch C within casing 10 whence the drive passes through change speed transmission D, of any desired type, and thence as usual to the vehicle ground wheels.

The engine crankshaft 11 carries the vaned impeller 12 of coupling B whereby oil is circulated in known manner to drive vaned runner 13 mounted on a hollow shaft 14. The drive from shaft 14 passes through a conventional friction clutch C, which is releasable under control of pedal 15 to facilitate shifting gears in the transmission D, to drive the transmission input shaft 16. This is a conventional arrangement as thus far described and will serve to illustrate one environment in which my invention may be used.

I have provided clutching means E for positively transmitting a direct two-way drive between shafts 11 and 14. Shaft 14 has a forward portion 17 journalled by bearing 18 in the rear end of the crankshaft 11 by reason of the impeller hub 19 attached to the crankshaft. This shaft portion 17 is externally splined at 20 for sliding drive connection with a clutch member 21 which is externally formed with the axially extending teeth 22 adapted, when member 21 moves forwardly on splines 20, to engage the spaces between the internal teeth 23 which are carried by the rearwardly projecting extension 24 of hub 19, thereby positively clutching shafts 11 and 14 independently of coupling B.

In order to limit engagement of clutch E to synchronous conditions of shafts 11 and 14, I provide a blocker control ring 25 which is disposed within hub extension 24 and which is formed with internal teeth 26 on a common pitch circle with teeth 22 and 23 and located therebetween in blocking relationship with respect to teeth 22. A light spring 27 acts between a thrust ring 28 and blocker ring 25 to maintain the latter in light frictional engagement with hub extension 24. The blocker ring has at intervals around its circumference a long tooth 29 formed with a lug or free ended finger 30 projecting rearwardly therefrom into a recess 31 of member 21.

The arrangement of the parts is such that when the engine drives the vehicle through coupling B then, because of the inherent fluid slip in the coupling, shaft 11 will rotatably lead or drive faster than shaft 14 with the result that blocker ring 25 will be frictionally urged, under the pressure of spring 27, to rotate with shaft 11 to the limit of its travel for its drive blocking position at which time lug 30 engages the leading tooth 22 bounding space 31. The parts will remain in this position, shown in Fig. 4A, as long as the shaft 11 rotates faster than shaft 14 and under such conditions forward clutching movement of member 21 is prevented because blocker teeth 26 and leading portion of tooth 29 lie in the path of teeth 22.

If, when member 21 remains in its rearward Fig. 4A position, the driver releases the usual accelerator pedal 32 to allow the vehicle to coast and to cause shaft 14 to drive shaft 11 through coupling B, then the blocker ring will move to a coast blocking position of lagging the member 21 instead of the Fig. 4A leading position. At such time the blocker ring will move relative to member 21 until lug 30 engages the following tooth 22 bounding space 31 because spring 27 causes the blocker ring to be frictionally retarded relative to member 21 owing to the slip in coupling B which allows the shaft 11 to drop below the speed of shaft 14. Under such conditions the member 21 is likewise blocked against clutching shift by the teeth 26 and trailing portion of tooth 29. The circumferential length of space 31 which in Figure 4A is illustrated as that of a tooth 22 and two spaces between teeth 22 is therefore such as to cause teeth 26 and 29 to block teeth 22 when lug 30 is at each circumferential end of the space 31, the forward ends or abutments 50 of the teeth 22 striking the teeth 26 and 29 on any forward movement of the member 21. This arrangement provides a circumferentially oscillatable lost-motion connection between the blocker ring 25 and clutch member 21 with blocking occurring whenever the finger 30 is moved from its limit position at either end of the slot 31 a distance only slightly more than the width of a tooth 22.

When the relative relationship of shafts 11 and 14 is changing from drive to coast or vice versa, these shafts are momentarily rotating synchronously and if, at such time, the clutch member 21 is biased forwardly then clutching shift thereof is accommodated because the spaces between the blocker teeth 26 will then be axially aligned with teeth 22 and clutching of member 21 with teeth 23 will be accommodated. It will be observed in this connection looking endwise in Figure 4A and 5 that at this time the finger 30 of Figure 4A is positioned substantially midway the recess 31 of the sleeve 21 and hence the blocking teeth 26 and 29 of the ring 25 and the teeth 22 of the clutch sleeve 21 will be then in substantial circumferential juxtaposition, that is to say, substantially immediately adjacent or contiguous each other circumferentially without overlapping so that any change in relative speeds of shafts 11 and 14 will cause prompt reblocking. Engagement of sleeve 21 renders coupling B inoperative and provides a positive two-way drive between shafts 11 and 14. Once clutch E is engaged then it can be disengaged to restore the coupling B to normal operation whenever the force biasing member 21 rearwardly is sufficient to overcome the drive or coast load between the teeth 23 and 22.

It is difficult for the driver to try to engage member 21 at nearly the proper moment and inconvenient to maintain a biasing effort on member 21 while awaiting synchronous or unloading conditions and I have therefore provided a preselective operating mechanism as follows.

At some convenient point, as at the instrument panel 33, there is a hand control 34 having two positions of push-pull setting determined by the spring ball detent mechanism 35. This control 34 extends by cable and linkage mechanism 36 to a lever 37 and incorporates a yielding lost motion device F comprising a piston 38 operating in a cylinder 39. Preloaded springs 40, 41 yieldingly bias the piston in the middle of the length of the cylinder as shown in Fig. 4.

Lever 37 is pivotally mounted at 42 and is provided with a depending yoke 43 for actuating a sleeve 44 surrounding shaft 14 and slidable thereon. This sleeve has a thrust ring 45 secured thereto and depending in an annular groove 46 of shaft 14. Shaft 14 has a plurality of axially extending openings therethrough slidably receiving thrust rods 47 the rear ends of which bear against the forward face of ring 45 and the front ends of which bear against the rear face of thrust ring 28.

With my arrangement the driver may at any time operate the control 34 and the clutch E will usually respond at some time thereafter, depending on the relationship of speeds of shafts 11 and 14 or torque transmission therebetween. For example, if while the engine is driving the vehicle, the driver pulls the control 34 then cylinder 39 of device F moves rearwardly, further compressing spring 40 and unloading spring 41 but piston 38 will remain approximately in its Fig. 4 position because clutch member 21 is blocked by blocker ring 25 against forward clutching movement, the lever 37, sleeve 44, rods 47 and thrust ring 28 only moving sufficiently to take up any clearance in the parts between blocker teeth 26 and piston 38. However, with the detent 35 holding the control 34 in its pulled-out position, the ball of the spring-pressed detent now engaging the groove 49, of control 34 and with the spring 40 exerting a greater force than the spring 41 and urging piston 38 rearwardly, the clutch E will automatically engage without further attention from the driver the next time he releases the accelerator pedal 32 to allow the engine to slow down to approximately the speed of shaft 14 because, as aforesaid, blocker ring 25 at such time moves from its Fig. 4A drive blocking position half-way toward its coast blocking position and the teeth of clutch member 21, being biased forwardly by loaded spring 40 acting through piston 38, lever 37, sleeve 44, rods 47, and thrust ring 28, will move through the blocker teeth and engage teeth 23.

The shafts 11 and 14 are now coupled independently of the fluid coupling and will remain so until the driver pushes control 34 forwardly to engage the ball of the spring-pressed detent 35 in the groove 48 of control member 34. When this occurs the parts of device F are restored to their Fig. 4 relationship, the spring 40 previously loaded by pulling control 34 rearwardly being now released of its extra loading and assuming a balance with spring 41 and the device F will move the sleeve 44 rearwardly to its Fig. 2 position thus enabling spring 27 to restore clutch member 21, ring 28, and rods 47 to their Fig. 2 position.

If the control 34 is set to release the clutch E when the engine is driving the vehicle under appreciable load through clutch E, then the clutch member 21 will not be immediately restored to its Fig. 2 position but will later release automatically as aforesaid by action of spring 27 by reason of the driver releasing the accelerator pedal to unload the torque at teeth 22, 23. Spring 27 ordinarily exerts only light pressure, with the parts positioned as in Fig. 2, in order to frictionally energize the blocker ring into one or the other of its two blocking positions and when the clutch member 21 moves forwardly into its clutching position to additionally compress spring 27 then the blocker ring 25 is of course held against frictional slip with respect to hub projection 24 so that there will not be any objectionable friction wear at the blocker ring.

When clutch E is biased to its disengaging relationship by pushing control 34 inwardly to its Fig. 1 position, this clutch will disengage in response to unloading the torque at teeth 23, 26 and obviously this may be either drive torque or coast torque depending on whether the vehicle is being driven by the engine or is coasting against the engine at the time of pushing control 34. In the latter instance the torque is diminished by depressing the accelerator pedal.

Likewise clutch member 21 automatically responds, in clutching, to an outward movement of control 34 by either releasing or depressing the accelerator pedal to bring about synchronous unblocking of clutch member 21 at ring 25 depending on whether the engine is driving the car or the car driving the engine at the time of pulling the control 34.

In parking the vehicle on a hill, the driver manipulates transmission D to drivingly connect the vehicle driving wheels with shaft 14 and then he pulls out the control 34 to engage clutch E and thereby connect shaft 11 with shaft 14 independently of the coupling B. The dead engine now serves as a brake against vehicle movement. In order to insure clutching of the clutch E the driver may always engage clutch E in advance of coming to a stop preparatory to parking by pulling control 34 while driving and allowing clutch E to engage by releasing the accelerator pedal. However clutch E will ordinarily engage even if biased toward engagement after the vehicle has been stopped. For example, after the vehicle has stopped the driver shuts off the ignition and the engine comes to a stop with blocker ring 25 in its drive blocking position, the driver then pulling control 34. If the vehicle starts to roll when parked, the roll is immediately checked because the clutch member 21 rotates forwardly with shaft 14 a distance of one tooth 22 relative to the blocker ring 25 and teeth 23. This unblocks the clutch member 21 and allows the same to move forwardly to clutch with teeth 23. By a selection of forward or reverse setting at transmission D correlated with parking on an up-grade or down-grade sleeve E may always be made to engage after the vehicle has been stopped. The driver may readily determine the proper setting by seeing whether the vehicle is capable of rolling, in excess of the slight amount for engaging clutch E, before he leaves the vehicle because if clutch E is engaged then the vehicle will be held against movement, the engine being dead.

If desired my drive control may be used with any type of mechanism, other than in a motor vehicle, which lends itself to adaptation of the principles of my invention.

I claim:

1. In a motor vehicle drive having a rotatable driving structure adapted to receive drive from the engine, and a rotatable driven structure adapted to transmit drive from the driving structure for driving the vehicle, a first ring-like set of circumferentially spaced teeth carried by the driving structure, a second ring-like set of circumferentially spaced teeth carried by the driven structure, a blocker member coaxial with said sets of teeth, clocking means on said blocker member extending into a recess between a pair of adjacent teeth of one of said sets of teeth to provide an oscillatory lost motion drive connection between said block member and this set of teeth limited by said pair of teeth, means mounting said one of said sets of teeth for axial shifting movement relative to the other to positively engage at least one of the teeth of said sets of teeth; said blocker member and the said one set of teeth including means providing blocking engagement therebetween when said blocker is at its limits of oscillating movement, said means comprising an abutment on said one set of teeth and a blocking element on said blocker member circumferentially spaced from said extending clocking means of said blocker member for engaging said abutment upon shift of the shiftable teeth when said blocker member is at one limit of said oscillating movement; said abutment and blocking element being in circumferential juxtaposition when said clocking means is circumferentially substantially midway said recess.

2. In a motor vehicle drive having a rotatable driving structure adapted to receive drive from the engine, and a rotatable driven structure adapted to transmit drive from the driving structure for driving the vehicle, a first ring-like set of circumferentially spaced teeth carried by the driving structure, a second ring-like set of circumferentially spaced teeth carried by the driven structure, a blocker member operably intermediate said sets of teeth, means on said blocker member extending between an adjacent pair of teeth of one of said sets of teeth to provide for oscillating movement of said blocker member relative to this set of teeth limited by said pair of teeth, means mounting one of said sets of teeth for axial shifting movement relative to the other to positively engage at least some of the teeth of said sets of teeth; said blocker member and the said one set of teeth including means providing blocking engagement therebetween when said blocker member is at its limits of oscillating movement, said means comprising an abutment, and first and secondary blocking elements for engaging said abutment upon shift of the shiftable teeth, said first blocking element providing for said blocking engagement during shift of the shiftable teeth when the driving structure rotates at a speed faster than that of the driven structure and said secondary blocking element providing for said blocking engagement during shift of the shiftable teeth when the driving structure speeds up from coast to a speed faster than that of the driven structure, said abutment and blocking elements being in circumferential juxtaposition when said clocking means is circumferentially substantially midway said recess.

3. In a clutch mechanism, in combination with a pair of torque transmitting members to be drivingly connected, each having radially extending teeth, a jaw clutch sleeve having internal teeth meshing with the teeth of one of said members, and a multiplicity of teeth axially slidable into clutching engagement with the teeth of the other member; and a blocker ring having a lug received in a recess between a pair of said sleeve clutching teeth to provide for limited oscillating movement of said ring relative to said sleeve, said blocker ring also having a radially extending blocker element circumferentially offset relative to said lug and arranged to be disposed in blocking relation with one of said pair of sleeve clutching teeth when the blocker ring is at one limit of said oscillating movement, said blocker element and said one clutching tooth being in substantial circumferential juxtaposition when said lug is circumferentially substantially midway said recess.

4. In a clutch mechanism in combination with a pair of rotatable torque transmitting members to be drivingly connected, one having radially outwardly extending teeth and the other having radial inwardly extending clutching teeth, a jaw clutch sleeve having internal teeth meshing with the said outwardly extending teeth of said one member and having a multiplicity of external clutching teeth shiftable into clutching engagement with said inwardly extending clutching teeth of said other member, a blocker member coaxial with said engageable clutching teeth, tooth means on said blocker member having an oscillatory lost motion driving connection with said clutch sleeve limited by a pair of said external clutching teeth of said sleeve and other means comprising a blocking element on said blocker member and an abutment on said clutch sleeve for providing blocking engagement between said blocker member and clutch sleeve when said blocker member is at one limit of said oscillating movement, said blocking element and said abutment being in substantial circumferential juxtaposition when said tooth means on said blocker element is circumferentially substantially midway said pair of clutching teeth.

5. In a clutch mechanism, in combination with a pair of torque transmitting members to be drivingly connected, one having radially outwardly extending teeth and the other having radial inwardly extending clutching teeth, a jaw clutch sleeve having internal teeth meshing with the said outwardly extending teeth of said one member and having a multiplicity of external clutching teeth shiftable into clutching engagement with said inwardly extending clutching teeth of said other member, a circumferential recess between a pair of said external clutching teeth, a blocker ring having a lug portion received in said recess to provide for limited oscillating movement of said ring relative to said sleeve and having a blocker portion spaced circumferentially from said lug portion to be selectively disposed in blocking relation with a portion of said clutch sleeve when the ring is at one limit of its oscillating movement and in another position of said oscillating movement to permit the sleeve to move into clutching engagement with the clutching teeth of said other member, said ring blocker portion and said sleeve blocking portion being in substantial circumferential juxtaposition when said lug is circumferentially substantially midway said recess.

6. In a clutch mechanism, in combination with a pair of torque transmitting members to be drivingly connected, one having radially outwardly extending teeth and the other having radial inwardly extending clutch teeth, a jaw clutch sleeve having internal teeth meshing with the teeth of said one member and having a multiplicity of external clutching teeth axially slidable into clutching engagement with the clutch teeth of said other member, a recess between a pair of said external clutching teeth, a blocker ring having an axially extending lug received in said recess to provide for limited oscillating movement of said ring relative to said sleeve, said blocker ring also having a radially inwardly extending blocker element axially offset from said lug to be selectively disposed in blocking relation to an end portion of one of said sleeve teeth when the ring is at one limit of its oscillating movement and adapted in another position of said oscillating movement of said ring to pass between adjacent sleeve teeth so as to permit the sleeve to move into clutching engagement with the clutch teeth of said other member, said blocker element and said one sleeve tooth being in substantial circumferential juxtaposition when said lug is circumferentially substantially midway said recess.

7. In a clutch mechanism, in combination with a pair of torque transmitting members to be drivingly connected, one having radially outwardly extending teeth and the other having radial inwardly extending clutching teeth, a jaw clutch sleeve having internal teeth meshing with the said outwardly extending teeth of said one member and having a multiplicity of external clutching teeth shiftable into clutching engagement with said inwardly extending clutching teeth of said other member, a blocker member intermediate said engageable clutching teeth having a lug portion within the periphery of this member receivable in a recess between a pair of said sleeve clutch teeth to provide for limited oscillating movement of said blocker member relative to said sleeve, said blocker member also having a pair of blocker lug portions, one on either side rotatably of said first mentioned lug portion, one of said blocker lug portions being adapted for selective positioning in blocking relation to one of said pair of clutching teeth when the blocker member is at one limit of its oscillating movement and the other of said blocker lug portions being adapted at the other limit of said oscillating movement to be in blocking relation to the other of said pair of clutching teeth, said blocker lug portions and the respective sleeve clutching teeth adapted for blocking relationship therewith being in substantial circumferential juxtaposition when said first mentioned lug is circumferentially midway said recess.

8. In a clutch mechanism, in combination with a pair of torque transmitting members to be drivingly connected, one having radially outwardly extending teeth and the other having radial inwardly extending clutching teeth, a jaw clutch sleeve having internal teeth meshing with the said outwardly extending teeth of said one member and having a multiplicity of external clutching teeth shiftable into clutching engagement with said inwardly extending clutching teeth of said other member, a circumferential recess between a pair of said external clutching teeth, a blocker ring intermediate said engageable clutching teeth, having an inwardly extending lug of T section, the leg portion of said T being receivable in said recess to provide for limited oscillating movement of said ring relative to said sleeve, the side portions of said T providing for blocking engagement between said ring and sleeve upon axial shifting movement of said sleeve when the ring is at either limit of its oscillating movement, one of said side portions abutting one of said pair of sleeve clutching teeth during shift of the sleeve when the driving structure rotates at a speed faster than that of the driven structure and the other side portion of said T lug abutting the other of said pair of sleeve clutching teeth during shift of the sleeve when the driving structure speeds up from coast to a speed faster than that of the driven structure, said side portions of said T-sectioned lug and the respective teeth of said pair of clutching teeth abuttable thereby being in substantial circumferential juxtaposition when said leg portion of said T-sectioned lug is circumferentially substantially midway said recess.

9. A clutch mechanism as claimed in claim 8 wherein said recess is of sufficient width to receive said T lug at another position of said oscillating movement of said ring so as to permit the sleeve to move into clutching engagement with the clutch teeth of said other member.

10. A clutch mechanism as claimed in claim 4 including means biasing said blocker member into frictional driving relation with said torque transmitting member having said clutching teeth.

11. In a clutch mechanism, in combination with a pair of torque transmitting members to be drivingly connected, one having a continuous circumferential series of radially inwardly extending clutching teeth in the nature of gear teeth and the other having an axially shiftable sleeve splined thereon including a continuous circumferential series of external clutching teeth of the same diametrical pitch as the clutch teeth of the said one member and shiftable into clutching engagement with said one member to establish said drive connection, at least an end portion of one of said sleeve clutching teeth being omitted to provide a recess of a width greater than the circular pitch of the teeth, a blocker member intermediate said engageable clutching teeth provided with a continuous circumferential series of internal teeth of the same diametrical pitch as said clutching teeth, a pair of said blocker member teeth being connected by a lug extending axially into said recess to provide for limited oscillating movement of said blocker member relative to said sleeve, whereby said sleeve clutch teeth will during shift of the sleeve be brought into blocking relation with the teeth of said blocker member when said blocker member is at either limit of its oscillating movement but will in another position of said oscillating movement permit said sleeve clutch teeth to pass between said blocker member teeth and to move into clutching engagement with the clutching teeth of said one member.

12. In a clutch mechanism, in combination with a jaw clutch element and a torque transmitting member to be synchronized therewith, a toothed jaw clutch sleeve member mounted on said torque transmitting member drivingly connected thereto and axially slidable thereon, said sleeve having a multiplicity of clutch teeth movable into clutching engagement with said jaw clutch element, and a blocker ring operably interposed between said sleeve and said jaw clutch element, said ring having a lug disposed in operable relationship with a pair of adjacent teeth of said sleeve clutching teeth to provide a lost motion driving connection between said ring and sleeve limited by said pair of teeth, and having a blocker portion adapted, when said ring is at one limit of said lost motion connection, to be disposed in blocking relation to a portion of said sleeve so as to block movement of said sleeve into clutching engagement with said jaw clutch element, said lug and blocker portion being axially related with respect to each other and said ring blocker portion and said sleeve blocking portion being in substantial circumferential juxtaposition when said lug is circumferentially substantially midway said recess.

13. In a clutch mechanism, in combination with a jaw clutch element and a torque transmitting member to be synchronized therewith, a hub member splined on said torque transmitting member, a jaw clutch sleeve member mounted on said hub member drivingly connected thereto and axially slidable thereon, said sleeve member having a multiplicity of clutching teeth movable into clutching engagement with said jaw clutch element, and a blocker ring interposed between said sleeve and said jaw clutch element, said ring having a lug disposed in operable relationship with a recess on said sleeve to provide a lost motion driving connection between said ring and sleeve, and having a blocker portion circumferentially spaced from said lug adapted, when said lug is at one limit of said lost motion connection, to be disposed in blocking relation to a portion of said sleeve and adapted when said lug is circumferentially substantially midway said recess to permit clutching engagement of said sleeve member and jaw clutch element, said blocker portion and said sleeve portion being then in substantial circumferential juxtaposition.

14. In a clutch mechanism, in combination with a jaw clutch element and a torque transmitting member to be synchronized therewith, a jaw clutch sleeve member mounted on said torque transmitting member drivingly connected thereto and axially slidable thereon, said sleeve member having a multiplicity of clutching teeth movable into clutching engagement with said jaw clutch element, and a blocker ring operably interposed between said sleeve and said jaw clutch element, said ring having a free-ended finger engageable with a recess on said sleeve to provide a lost motion driving connection between said ring and sleeve limited by the latter, and having an independent blocker portion connecting with said finger and axially related to said finger adapted, when said finger is at one limit of said lost motion connection, to be disposed in blocking relation to a portion of said sleeve bounding on said recess and adapted when said finger is circumferentially substantially midway said recess to permit clutching engagement of said sleeve member and jaw clutch element, the said blocker portion and the said sleeve portion being then in substantial circumferential juxtaposition.

15. In a clutch mechanism, in combination with a jaw clutch element and a torque transmitting member to be synchronized therewith, a jaw clutch sleeve member mounted on said torque transmitting member drivingly connected thereto and axially slidable thereon, said sleeve member having a multiplicity of clutching teeth movable into clutching engagement with said jaw clutch element, and a blocker ring interposed between said sleeve and said jaw clutch element, said ring having a lug disposed between portions of the sleeve defining a recess to provide a lost motion driving connection between said ring and sleeve, and having a blocker portion adapted, when said lug is at one limit of said lost motion connection, to be disposed in blocking relation to a portion said sleeve bounding on said recess, and having a second blocker portion adapted when said lug is at the other limit of said lost motion connection to be disposed in blocking relation to another portion of said sleeve bounding on said recess, said lug and the respective blocker portions being axially related and circumferentially offset one with respect to the other, said blocker portions being also adapted when said lug is circumferentially substantially midway said recess to permit clutching engagement of said sleeve member and jaw clutch element, the said blocker portions of said ring and the said blocking portions of said sleeve being then in substantial circumferential juxtaposition.

16. In a clutch mechanism, in combination with a pair of torque transmitting members to be drivingly connected, each having radially extending teeth, a jaw clutch sleeve having teeth meshing with the teeth of one of said members and a multiplicity of teeth axially slidable into clutching engagement with the teeth of the other member; and a blocker ring having a lug provided with side faces and received in a recess between a pair of said sleeve clutching teeth each of which has a side face facing a side face of the other and has an end face normal to the axis of rotation of the sleeve, the side faces of the lug being adaptable for engagement with the said side faces of said pair of sleeve teeth to provide a limited oscillating movement of the ring relative to said sleeve; said blocker ring also having a radially extending blocker element having a blocking face circumferentially offset relative to a side face of said lug, the said face of said blocker element being substantially normal to the axis of rotation of the said blocker ring and being adapted to be disposed in blocking relation with an end face of one of said pair of sleeve clutching teeth when the blocker ring is at one limit of said oscillating movement with the side face of said one sleeve tooth engaged with a side face of said lug, said blocking face of said blocker ring and said blocking end face of said one sleeve tooth being in substantial circumferential juxtaposition when said lug is circumferentially substantially midway said recess.

17. In a power transmission, a drive mechanism, a gear formed on said drive mechanism, a driven shaft, a toothed shiftable member drivingly associated with said driven shaft and adapted to directly engage said gear, a blocker member mounted in frictional engagement with said drive mechanism and adapted to block movement of said shiftable member toward engagement with said gear, and radially extending means formed on said blocker member for cooperating with the teeth of said shiftable member to limit rotation of the blocker member.

18. In a power transmission, a drive mechanism, a gear formed on said drive mechanism, a driven shaft, a toothed member drivingly associated with said driven shaft and axially movable into direct engagement with said gear, a blocker member positioned on said drive mechanism in frictional driving engagement therewith for blocking movement of said toothed member toward engagement with said gear, and a lost motion connection between said blocker member and the teeth of said toothed member and formed on said blocker member for limiting the rotation thereof in relation to said toothed member.

19. In a power transmission, a drive mechanism, a gear formed on said drive mechanism, a driven shaft, a toothed member drivingly associated with said driven shaft and axially movable into direct engagement with said gear for driving said driven shaft, a blocker member positioned on said drive mechanism in frictional engagement therewith and adapted to permit movement of said toothed member into engagement with said gear when the speeds of rotation of said member and gear are substantially equal, and radially extending means formed on said blocker member and designed to limit rotation of said blocker relative to said toothed member by engaging said teeth thereof.

20. In a power transmission, a drive mechanism, a gear formed on said drive mechanism, a driven shaft, a toothed member drivingly associated with said driven shaft and axially movable into direct engagement with said gear, a blocker member secured on said drive mechanism in frictional driving engagement therewith and adapted to be directly engaged by said toothed member and permit the same to be moved into engagement with said gear when the speeds of said toothed member and gear are substantially equal, and radially extending means formed on said blocker member designed to co-act with adjacent teeth of said toothed member to limit rotation of said blocker in relation thereo.

21. In a power transmission, a drive mechanism, a gear formed on said drive mechanism, a driven mechanism, a toothed member forming a part of said driven mechanism and axially movable into engagement with said gear, shortened teeth formed on said toothed member, a blocker for controlling axial movement of said member comprising a ring positioned on a portion of said drive mechanism, blocking means formed on said ring designed to be moved in front of said shortened teeth, and a limit means formed on said ring adapted to move between two teeth of the toothed member and limiting the movement of said blocking means.

22. In a power transmission, a drive mechanism, a gear formed on said drive mechanism, a driven mechanism, a toothed member forming part of said driven mechanism and axially movable into engagement with said gear, shortened teeth formed on said toothed member, a blocker for controlling axial movement of said member comprising a ring positioned on a portion of said drive mechanism, blocking means formed on said ring designed to be moved in front of said shortened teeth, and a limit means formed on said ring and adapted to limit the movement of said blocking means.

23. In a clutch mechanism, in combination with a jaw clutch element and a torque transmitting member to be synchronized therewith, a jaw clutch sleeve member mounted on said torque transmitting member for driving connection thereto and axially slidable thereon, said sleeve having a multiplicity of teeth movable into clutching engagement with said jaw clutch element, and a blocker ring adjacent said sleeve member and element, said ring having a projection, said projection including a base portion and a free-ended clocking extension of less transverse dimension than said base portion so as to provide a blocking portion on said base portion on either side of said extension the said blocking portions being substantially symmetrical and circumferentially aligned, said extension being engageable in a recess on said sleeve member and providing a lost motion driving connection between said ring and sleeve member limited by the latter, and said base portion adapted when said ring is at either limit of said lost motion connection to have one of said blocking portions thereof disposed in blocking relation to one of substantially symmetrical and circumferentially aligned blocking portions of said sleeve bounding on said recess so as to block movement of the sleeve toward clutching position, said blocking portions of said ring being also adapted when said extension is circumferentially substantially midway said recess to permit clutching engagement of said sleeve member and jaw clutch element, the said blocking portions of said ring and the said blocking portions of said sleeve being then in substantial circumferential juxtaposition.

24. In a clutch mechanism, in combination with a pair of torque transmitting members to be drivingly connected, each having radially extending teeth, a jaw clutch sleeve having internal teeth meshing with the teeth of one of said members and a multiplicity of other teeth axially slidable into clutching engagement with the teeth of the other member and a blocker ring having a clocking element received in a recess between a pair of said sleeve clutching teeth to provide for oscillatory movement of said ring relative to said sleeve limited by said pair of teeth, said blocker ring also having a radially projecting blocker element circumferentially disposed relative to said clocking element and adapted to be positioned in blocking relation with a sleeve tooth when said blocker ring is at one limit of said oscillatory movement, said blocking element being also adapted when said clocking element is circumferentially substantially midway said recess to permit clutching engagement of said clutch sleeve and said other member, the said blocking element of said ring and the said sleeve blocking tooth being then in substantial circumferential juxtaposition.

GEORGE J. HUEBNER, Jr.

REFERENCES CITED

The following references are of record in the file of this patent:

UNITED STATES PATENTS

| Number | Name | Date |
|---|---|---|
| 1,786,980 | Carling | Dec. 30, 1930 |
| 1,923,379 | Hunt | Aug. 22, 1933 |
| 2,009,507 | Matthews | July 30, 1935 |
| 2,022,096 | Thompson | Nov. 26, 1935 |
| 2,223,614 | Hopkins | Dec. 3, 1940 |
| 2,257,674 | Dunn | Sept. 30, 1941 |
| 2,369,369 | Peterson et al. | Feb. 13, 1945 |

FOREIGN PATENTS

| Number | Country | Date |
|---|---|---|
| 2,385 | Great Britain | Jan. 30, 1912 |
| 403,319 | Great Britain | Dec. 21, 1933 |

Certificate of Correction

Patent No. 2,562,357                                                           July 31, 1951

GEORGE J. HUEBNER, Jr.

It is hereby certified that error appears in the printed specification of the above numbered patent requiring correction as follows:

Column 3, line 53, for "Figure" read *Figures*; column 6, line 11, for "block" read *blocker*; line 15, for "one" read *some*; column 8, line 34, for "clutch" read *clutching*;

and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*